No. 626,077. Patented May 30, 1899.
G. W. MORRIS.
TRACTION ENGINE.
(Application filed Mar. 5, 1898.)
(No Model.) 5 Sheets—Sheet 1.

Witnesses:
Inventor
George W. Morris
By Attorneys

No. 626,077. Patented May 30, 1899.
G. W. MORRIS.
TRACTION ENGINE.
(Application filed Mar. 5, 1898.)
(No Model.) 5 Sheets—Sheet 3.

Witnesses:
Fred Gerlach
Oliver R. Dennis

Inventor:
George W. Morris
By Fisher & Fisher
Attorneys.

No. 626,077. Patented May 30, 1899.
G. W. MORRIS.
TRACTION ENGINE.
(Application filed Mar. 5, 1898.)
(No Model.) 5 Sheets—Sheet 4.

Witnesses:

Inventor:
George W. Morris
By Peirce & Fisher
Attorneys.

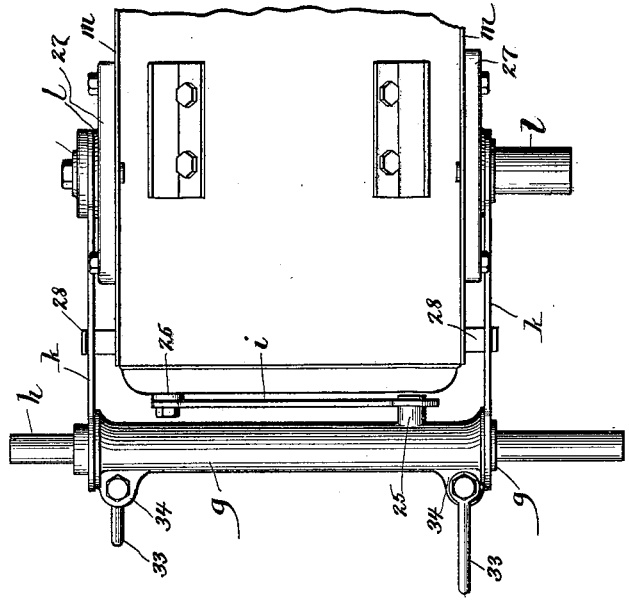
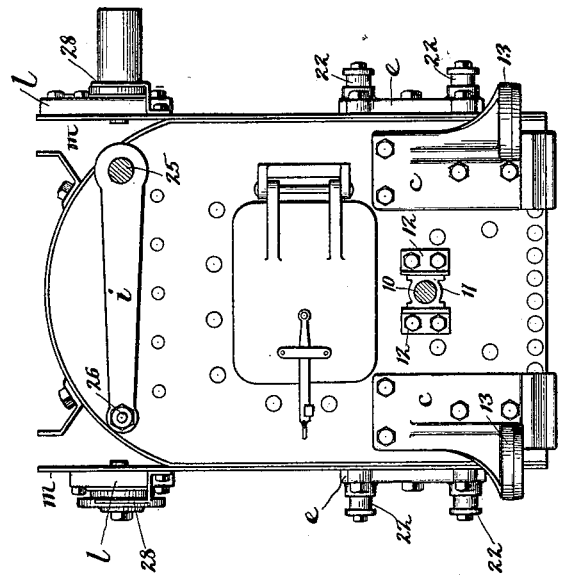

UNITED STATES PATENT OFFICE.

GEORGE W. MORRIS, OF RACINE, WISCONSIN, ASSIGNOR TO THE J. I. CASE THRESHING MACHINE COMPANY, OF SAME PLACE.

TRACTION-ENGINE.

SPECIFICATION forming part of Letters Patent No. 626,077, dated May 30, 1899.

Application filed March 5, 1898. Serial No. 672,671. (No model.)

*To all whom it may concern:*

Be it known that I, GEORGE W. MORRIS, a resident of Racine, in the county of Racine, State of Wisconsin, have invented certain new and useful Improvements in Traction-Engines, of which I do declare the following to be a full, clear, and exact description, sufficient to enable others skilled in the art to make and use the same.
In traction-engines it is familiar practice to mount the rear of the boiler-body on the main axle for the drive-wheels. Extended across back of the fire-box the axle receives and sustains the bearings projected from the boiler, the weight of the boiler being thus hung on the axle, generally at both sides of the machine near the wheels. Sometimes the bearings are permitted to have a slight rectilineal play, moving up and down with the axle, while springs interposed between the bearings proper and the boiler-body not only limit the play, but absorb the shock due to travel of the wheels over rough roads. The boiler is in a sense spring-suspended at its bearings on the main axle.

The present invention designs, as before, to hang the box-bearings from the axle; but instead of the rectilineal provides for a pivotal or radial play of the bearings both cross and length wise with reference to the boiler-body. The counter-shaft to drive the traction-wheels is set parallel with the main axle and is caused to participate in like measure with its radial play, the pitch-lines of the driving-gear being thus kept at true mesh throughout despite the shift, while the interposed springs may still serve, as in ordinary usage, to take up lost motion and neutralize the shocks of rough travel. The construction of parts employed to effect this and as well other improvements of lesser note will appear in detail from the following description.

The invention will be more definitely pointed out by claims at the conclusion.
On the drawings like parts bear like designation throughout.

Figure 1:
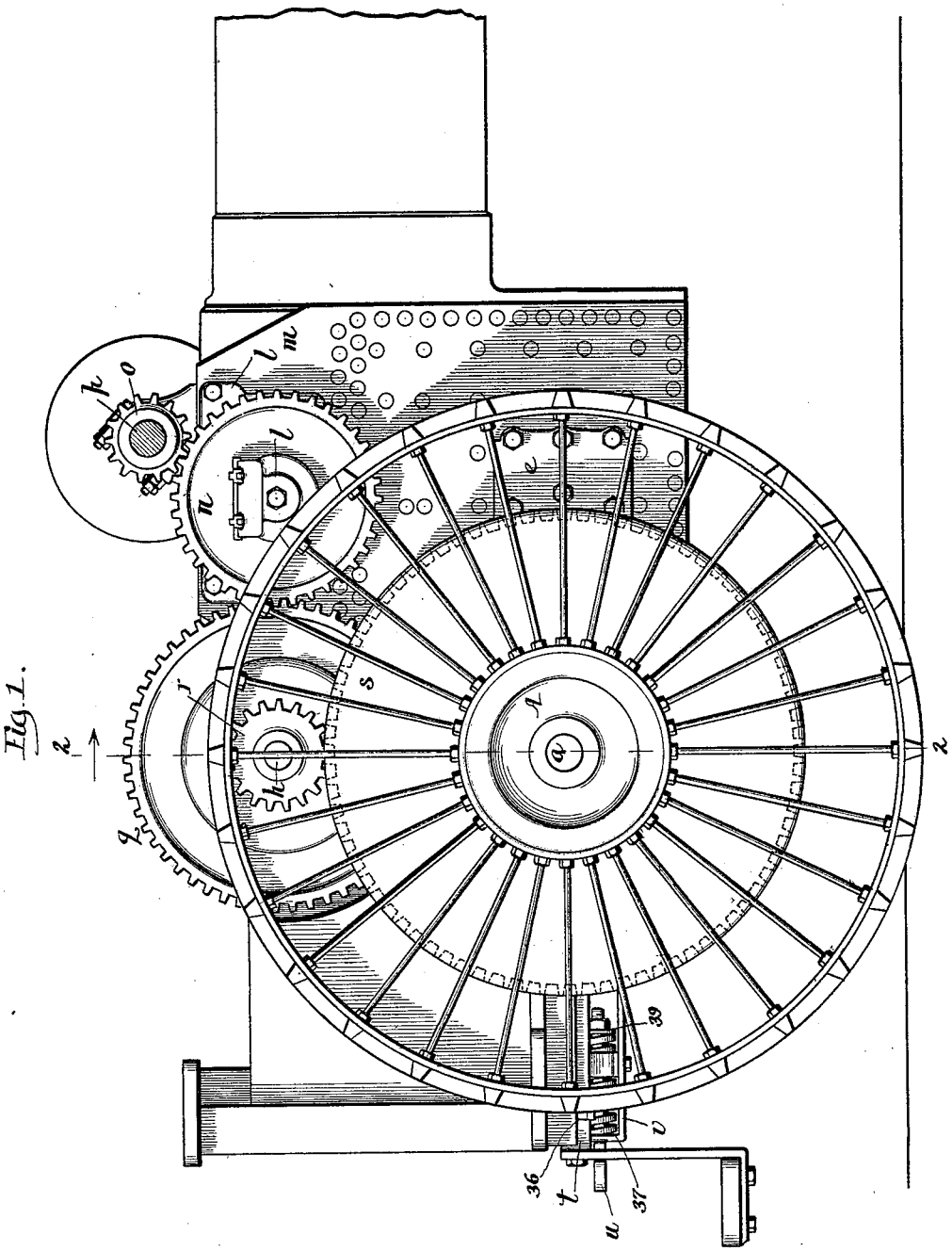
Figure 2:
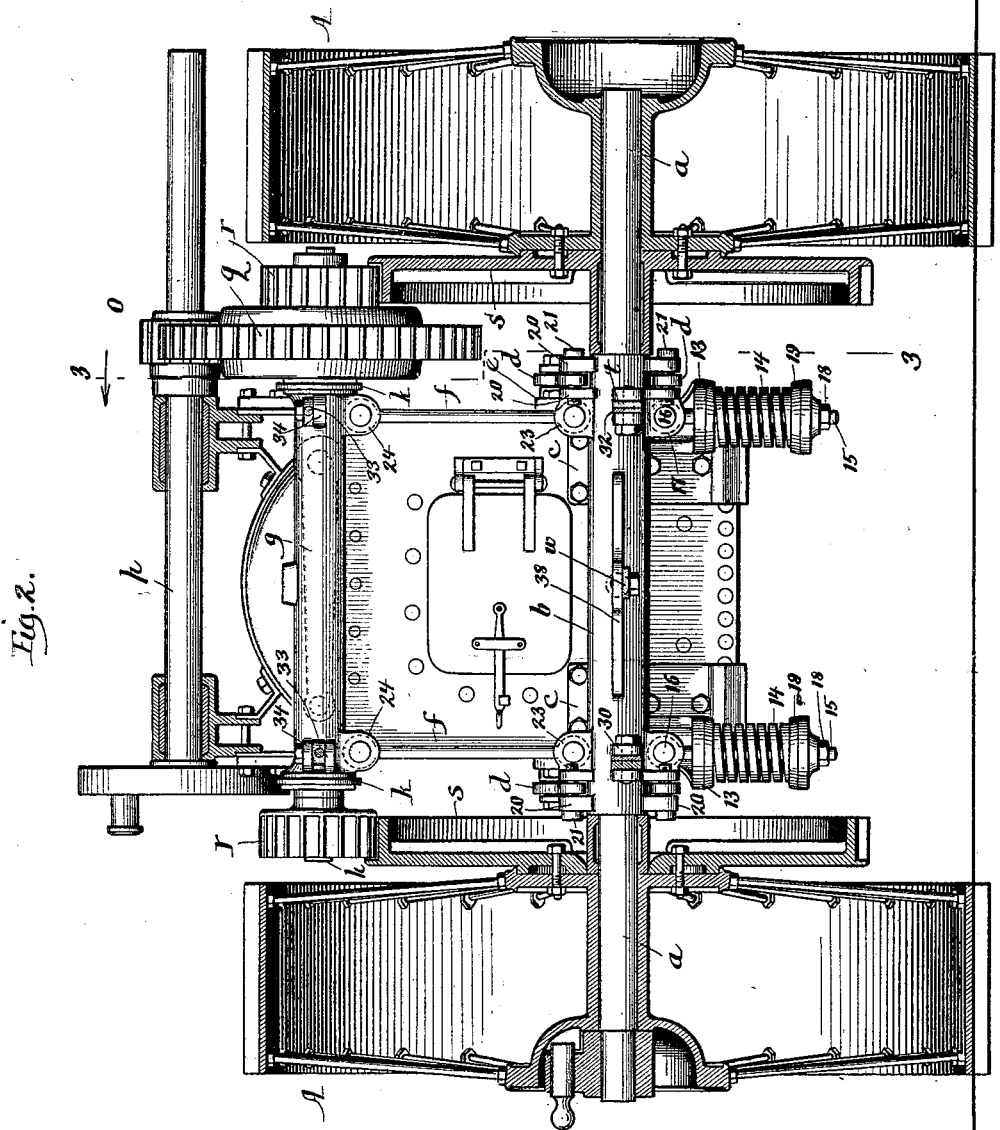
Figure 3:
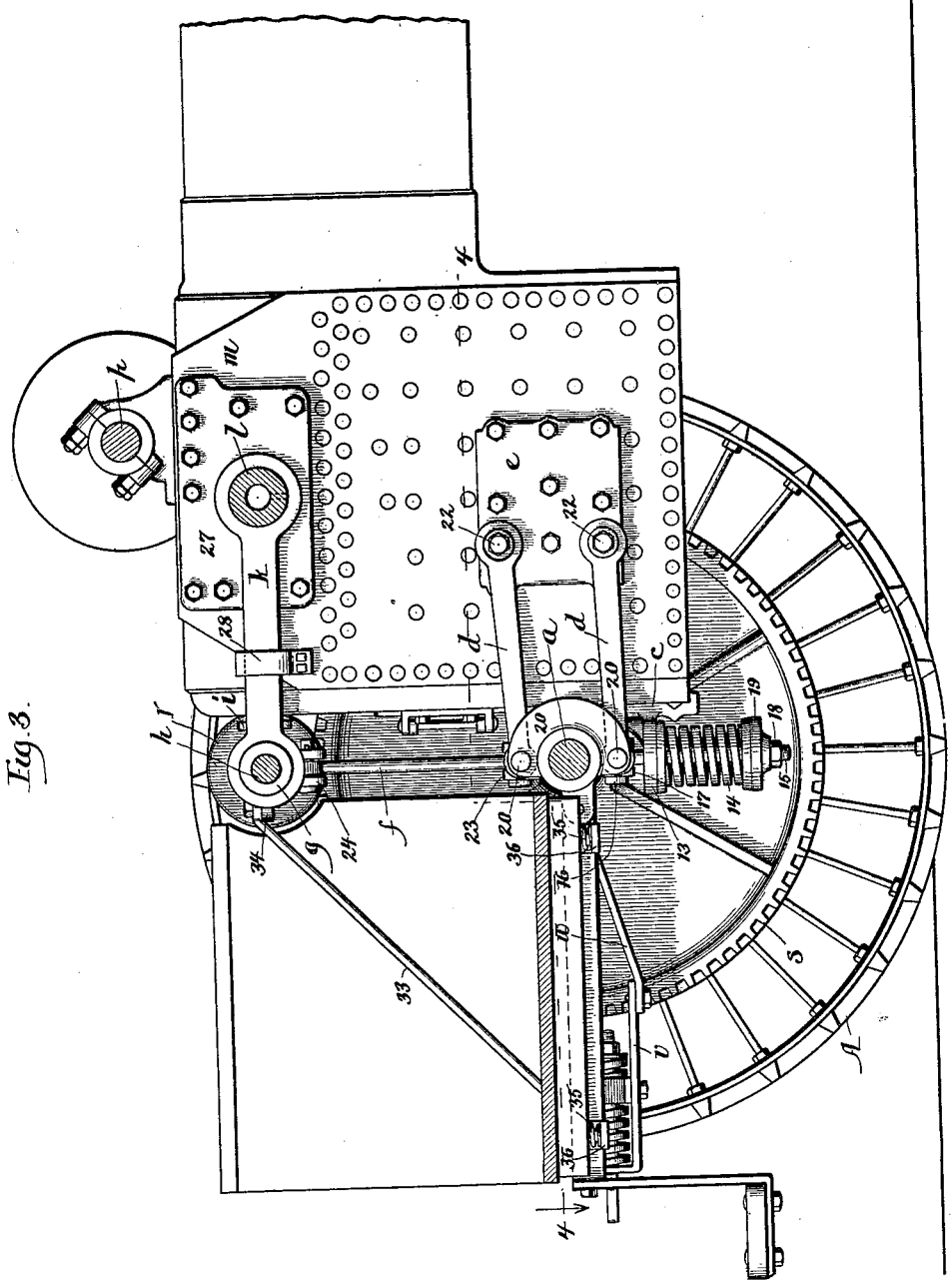
Figure 4:
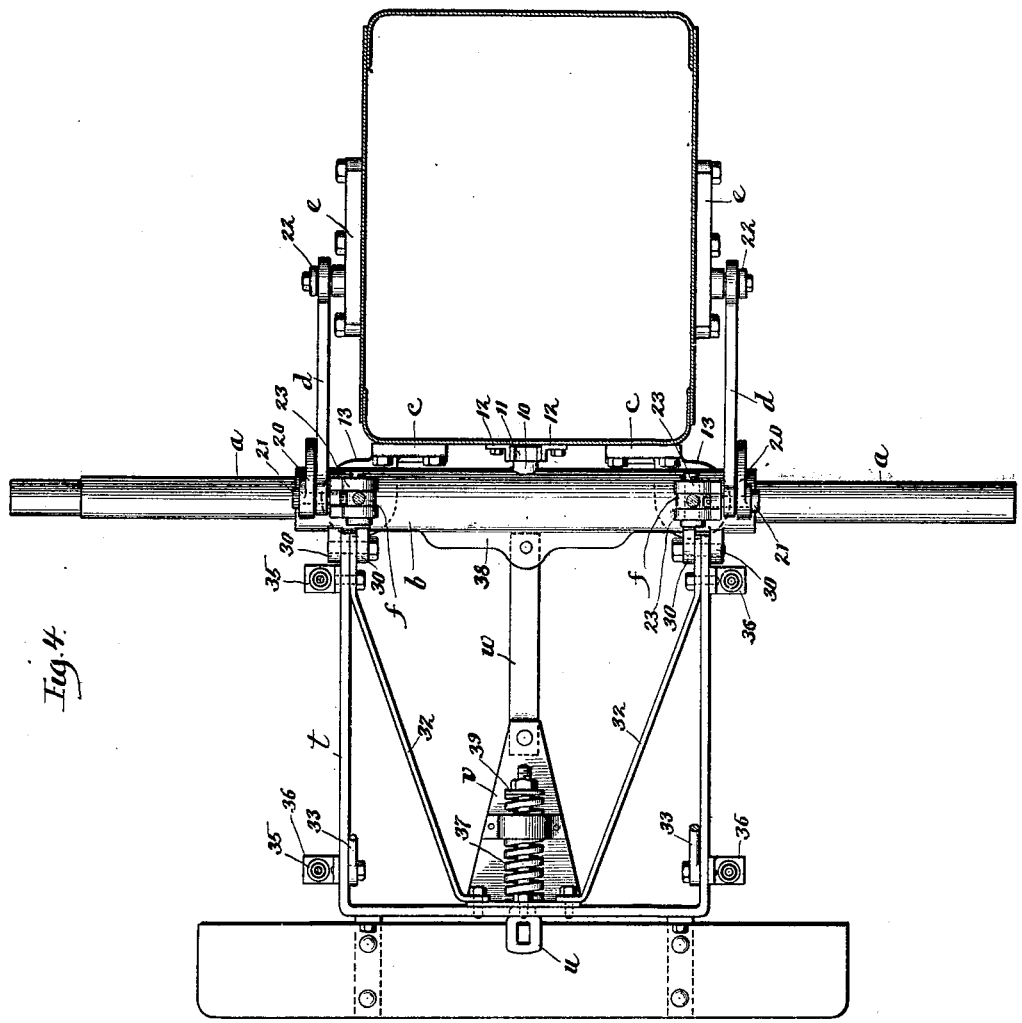

Figure 1 is a side elevation toward the rear of the improved engine; Fig. 2, a view in cross-section with parts shown in elevation at line 2 2 of Fig. 1; Fig. 3, a view in vertical longitudinal section at line 3 3 of Fig. 2; Fig. 4, a view in horizontal longitudinal section at line 4 4 of Fig. 3; Fig. 5, a rear elevation of the machine immediately back of the fire-box, some parts being in section; Fig. 5ª, a plan of the rear portion of the machine-body with details removed for sake of clearness.

Extended across at the back of the machine between the usual traction-wheels A is the long main axle $a$. Upon said axle at each side are sleeved the bearings or hangers to suspend the boiler-body. In the form here shown the dual hangers are rigidly united as a single cylindric casting, being no more than the opposite end portions of lower cannon-box $b$. The cannon-box scheme of structure presents an effective means for insuring the reciprocal interaction of the hangers against side thrust or during pivotal play, and because of its simplicity in joining the hangers directly together is generally to be preferred in practice.

At its mid-front the cannon-box carries a stout trunnion 10, Figs. 4 and 5, journaled in block 11. The block 11 slides freely between parallel guides 12, fastened to the fire-box below the charging-door. Coacting with the trunnion said sliding block allows for the radial movement of the cannon-box and as well for the vertical play of the boiler-body upon the cushion-springs, while the boiler is still restrained against side thrust or lurch. The trunnion-block thus constitutes an advantageous sort of control connection between the cannon-box and the body of the machine.

Brackets $c$, secured firmly to the lower rear corners of the fire-box, are furnished with projecting cups 13 to house the upper ends of coil-springs 14. Extended through said springs are suspension-rods 15, pivoted above, as at 16, between lugs 17, dependent from cannon-box $b$. In other words, the rods are hung beneath the end portions of the cannon-box, which constitute the bearings proper upon main axle $a$. At their opposite ends the rods 15 by nuts 18 adjustably sustain the cups 19, serving as seats for coil-springs 14. The pivotal junction of the rods at the cannon-box eases the rods during radial shift of the box-bearings and holds the springs stoutly seated.

The tension of the springs can be varied in keeping with the degree of "cushion" effect it is desired to maintain between the ground-wheels and the boiler. A nice adjustment of the springs through the medium of set-nuts 18 must relieve the engine, gearing, and other adjuncts, and as well the boiler which sustains them, from the severe wrenches and strains otherwise apt to ensue from the irregular travel of the ground-wheels over rough or stony roads.

At its opposite end bearings the lower cannon-box $b$ has dual flanges 20, between which, as at 21, pivot the rear ends of the companion drag-bars $d$. The front terminals of said drag-bars turn snugly upon studs 22, projecting rigidly from plates $e$, riveted to the sides of the fire-box. Owing to their radial connection between the boiler and the cannon-box for the main axle it is plain that drag-bars $d$ ease the boiler and save it from participating to an extreme in the rough movements of the ground-wheels. The drag-bars also keep the gear mechanism in true mesh despite the yielding relation noted, as will presently appear. The drag-bars, it is seen, are arranged in pairs united to the cannon-box in equidistant relation above and below the axis. In the radial play of the drag-bars about studs 22 as pivots the drag-bars serve as correctives upon each other, the cannon-box moving along the resultant path, which is practically a right line.

Cast upon the upper face of main cannon-box $b$, just within the flanges 20, Figs. 4, 2, and 3, are the ears 23, between which pivot the companion links $f$, said distance-links being pivoted above between ears 24, dependent from the counter-shaft cannon-box $g$. Cannon-box $g$ extends parallel to the lower cannon-box $b$ and affords end bearings for the counter-shaft $h$, which passes through it. A keeper $i$, Figs. 5, 5$^a$, and 2, pivots at one end upon a hub 25, projected from the front of cannon-box $g$, and at the opposite end upon a stud 26 at the rear of the boiler. The keeper holds cannon-box $g$ against endwise thrust, but permits it to share in the play of lower cannon-box $b$ without disturbing the alinement of the gearing.

Over the turned ends of box $g$ pivotally fit the radius-links $k$, which at their front are pivotally mounted upon studs $l$. Said studs project in piece from cast brackets 27, the latter being riveted to horn-plates $m$, fastened at opposite sides to the boiler. The reduced end of each stud passes through a hole in its horn-plate to relieve strain. The right-hand stud is hollow to admit lubricant for spur-wheel $n$. Straps 28, secured at the rear of horn-plates $m$, guard the radius-links $k$ against side play.

One of the studs $l$ affords a mount for spur-wheel $n$, Fig. 1, engaging with pinion $o$ of the engine crank-shaft $p$. Spur-wheel $n$ meshes in turn with the compensating gear $q$, carried by counter-shaft $h$. Pinions $r$ at opposite ends of the counter-shaft engage with the main gear $s$, secured to the ground-wheels. The organization of the drive mechanism is thus seen to be in general plan much the same as in ordinary rear-gear traction-engines.

Owing to the pivotal relation existing between the upper and lower cannon-boxes $g$ $b$ and the body of the boiler it is seen that both boxes respond equally in event the road or traction wheels ride into a depression or over an obstruction. The boxes shift crosswise after the plan of a set of parallel rules and also move up or down, according to the play of the traction-wheels, distinctly easing the body of the machine from severe wrench. The springs 14 serve cushion-like to relieve the strain, while the boxes readjust to maintain the gear mechanism at true pitch and mesh by virtue of the radial play of drag-bars $d$ and links $k$. Wear and tear upon the gear are thus avoided and strains from the motor-engine are very materially lessened.

The platform for the driver of the machine consists of a skeleton frame $t$, conveniently made of one piece of metal bent in U form, the frame being pivoted at its free front ends between lugs 30, extended from the rear of lower cannon-box $b$. The same bolts 31 at lugs 30 also secure the counter-braces 32, fastened at the rear to the base of the U-frame. Side braces 33, bolted below to frame $t$, pass diagonally upward and are secured to lugs 34 at the rear of counter-shaft cannon-box $g$. The driver's platform is thus hung from the companion cannon-boxes and always participates in their movements. For greater comfort the stringers at the floor of the platform can rest upon springs 35, carried by pedestals 36 at the sides of U-frame $t$.

Draw-bar $u$ at the back of the machine is encircled by coil-spring 37, bearing against an angle-plate $v$, bolted to skeleton frame $t$. The angle-plate $v$ extends forward, Figs. 3 and 4, and by strap $w$ fastens to the flange 38 at the rear of cannon-box $b$. A keeper 39 on plate $v$ holds spring 37 in place, the tension of said spring being adjusted by means of the nut on threaded terminal of draw-bar $u$. The draft at the draw-bar is distributed to the cannon-box $b$ at its middle and ends through the medium of plate $v$ and strap $w$ and the skeleton frame $t$.

Obviously the details of structure can be varied according to the mechanic's skill without essential departure from the invention.

Having thus described my invention, what I claim as new, and desire to secure by Letters Patent, is—

1. In traction-engines, the combination with the drive-wheels and their cross-axle, of the machine-body and the intermediate hangers or bearings carried upon the axle to suspend the machine-body; said hangers being radially sustained both cross and lengthwise in their relation to the machine-body, substantially as described.

2. In traction-engines, the combination with the drive-wheels and their cross-axle, of the machine-body and the intermediate cannon-box carried upon the axle to constitute connected hangers for suspension of the machine-body; said cannon-box being radially sustained both cross and length wise in its relation to the machine-body, substantially as described.

3. In traction-engines, the combination with the drive-wheels and their cross-axle, of the machine-body, the intermediate hangers or bearings carried upon the axle and radially sustained both cross and length wise in their relation to the machine-body and the yielding cushion-springs interposed between said hangers and the machine-body to absorb lost motion and shock, substantially as described.

4. In traction-engines, the combination with the drive-wheels and their cross-axle, of the machine-body, the intermediate cannon-box carried upon the axle and pivotally sustained both cross and length wise in relation to the machine-body and the yielding cushion-springs interposed between said cannon-box and the machine-body to absorb lost motion and shock, substantially as described.

5. In traction-engines, the combination with the drive-wheels and their cross-axle, of the intermediate hangers or bearings mounted upon the axle and pivotally sustained both cross and length wise in relation to the machine-body, the suspension-rods and coil-springs carried from said hangers and the machine-body having bracket extensions thereon to seat said springs, substantially as described.

6. In traction-engines, the combination with the drive-wheels and their cross-axle, of the intermediate cannon-box mounted upon the axle and pivotally sustained both cross and length wise in relation to the machine-body, the suspension-rods and coil-springs carried from said cannon-box and the machine-body having bracket extensions thereon to seat said springs, substantially as described.

7. In traction-engines, the combination with the drive-wheels and their cross-axle, of the intermediate cannon-box carried upon the axle to constitute connected hangers for suspension of the machine-body, the drag-bars extended pivotally at each side between said box and body and the central sliding trunnion connection also extended between said parts, substantially as described.

8. In traction-engines, the combination with the drive-wheels and their cross-axle, of the intermediate cannon-box carried upon the axle to constitute connected hangers for suspension of the machine-body, the interposed cushion-springs, the drag-bars extended pivotally at each side between said box and body and the central sliding trunnion connection also extended between said parts, substantially as described.

9. In traction-engines, the combination with the drive-wheels, and their cross-axle, of the intermediate cannon-box mounted thereon to constitute connected hangers for suspension of the machine-body, the interposed cushion-springs and the drag-bars pivotally extended between said cannon-box and machine-body in opposite pairs at each side; the separate drag-bars of each pair being respectively joined to said box above and below the center of the cross-axle, substantially as described.

10. In traction-engines, the combination with the machine-body, and with the ground-wheels sustaining the main axle, of the cannon-box mounted upon said axle, having yielding spring connection with the machine-body and central sliding pivot bearing thereon to prevent side play, substantially as described.

11. In traction-engines, the combination with the ground-wheels and the main axle, of the cannon-box mounted thereon, the machine-body carried by coil-springs and swinging suspension-rods from said box, the central sliding pivot extended between said box and body and the radial drag-bars also extended between them, substantially as described.

12. In traction-engines, the combination with the drive-wheels and their cross-axle, of the machine-body, the intermediate hangers carried upon the axle to suspend the machine-body, the counter-shaft pivotally sustained at its bearings by distance-links from said hangers in position parallel with the cross-axle and suitable means connecting the counter-shaft and cross-axle with the machine-body whereby said parts may shift radially in unison both cross and length wise in their relation to the machine-body, substantially as described.

13. In traction-engines, the combination with the drive-wheels and their cross-axle, of the machine-body, the intermediate hangers carried upon the axle to suspend the machine-body, the interposed cushion-springs, the counter-shaft pivotally sustained at its bearings by distance-links from said hangers in position parallel with the cross-axle and suitable means connecting the counter-shaft and cross-axle with the machine-body whereby said parts may shift radially in unison both cross and length wise in their relation to the machine-body, substantially as described.

14. In traction-engines, the combination with the main axle and the counter-shaft, of the cannon-boxes mounted respectively thereon and linked pivotally together, the machine-body in yielding spring suspension from the main-axle cannon-box and suitable means extended between the boxes and the machine-body to afford radial but not side play for said boxes across the machine, substantially as described.

15. In traction-engines, the combination with the main axle and counter-shaft and with the cannon-boxes mounted respectively thereon and pivotally linked together, of the machine-body suspended by coil-springs on the main-axle box and the radial drag-bars and links extended pivotally between the cannon-boxes and the machine-body, substantially as described.

16. In rear-gear traction-engines, the combination with the counter-shaft carrying the drive-pinion and also the compensating gear, of the radius-link uniting the box-bearing for said shaft with the machine-body and the gear-wheel sustained at the machine-body on the stud of said link and meshing respectively with the compensating gear and with the pinion of the engine crank-shaft, substantially as described.

17. In traction-engines, the combination with the main axle and the counter-shaft, of the box-bearings mounted respectively thereon and linked pivotally together and the platform-frame hung from said bearings at the back of the machine-body, substantially as described.

18. In traction-engines, the combination with the main axle and the counter-shaft of the cannon-boxes mounted respectively thereon and linked pivotally together, the U-frame for the driver's platform secured by its free ends to the rear of main-axle cannon-box and the diagonal side braces extended from the counter-shaft cannon-box to said U-frame, substantially as described.

19. In traction-engines, the combination with the main axle and with the cannon-box mounted thereon, of the platform-frame secured centrally and at its free ends to the rear of said cannon-box and the draw-bar having yielding spring connection with said frame, substantially as described.

GEORGE W. MORRIS.

Witnesses:
FRANK K. BULL,
FREDERICK ROBINSON.